Figure 1:
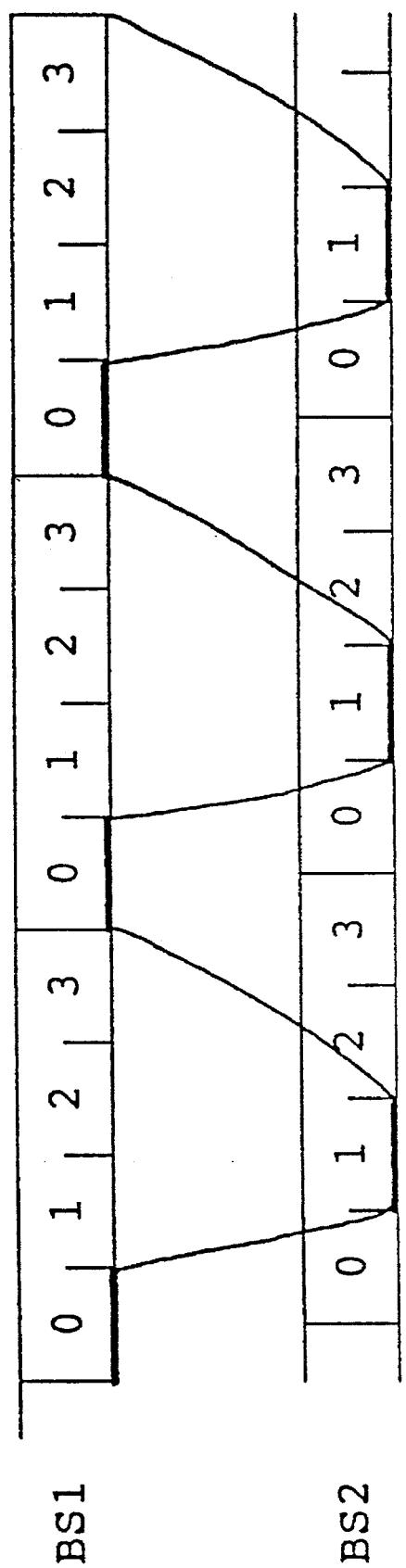

United States Patent [19]

Paavonen

[11] Patent Number: 5,479,410
[45] Date of Patent: Dec. 26, 1995

[54] MEASURING SIGNAL STRENGTHS OF ADJACENT BASE STATIONS IN A TDMA RADIO SYSTEM FOR A POSSIBLE HANDOVER

[75] Inventor: Tapio Paavonen, Saarijärvi, Finland

[73] Assignee: Nokia Telecommunications Oy, Espoo, Finland

[21] Appl. No.: 256,923

[22] PCT Filed: Nov. 29, 1993

[86] PCT No.: PCT/FI93/00502

§ 371 Date: Jul. 29, 1994

§ 102(e) Date: Jul. 29, 1994

[87] PCT Pub. No.: WO94/13113

PCT Pub. Date: Jun. 9, 1994

[30] Foreign Application Priority Data

Nov. 30, 1992 [FI] Finland ................................. 925448

[51] Int. Cl.⁶ ..................................................... H04J 3/16
[52] U.S. Cl. ............................ 370/95.3; 379/60; 455/33.2
[58] Field of Search .................................. 370/95.3, 95.1, 370/82, 58.1, 101, 102; 455/33.1, 33.2, 67.3; 379/60, 59

[56] References Cited

U.S. PATENT DOCUMENTS

| | | | |
|---|---|---|---|
| 4,107,608 | 8/1978 | Saburi | 370/95.3 |
| 5,172,375 | 12/1992 | Kou | 370/95.3 |
| 5,317,623 | 5/1994 | Sakamoto et al. | 379/60 |
| 5,345,499 | 9/1994 | Benveniste | 455/33.2 |
| 5,355,515 | 10/1994 | Sicher | 455/33.2 |

FOREIGN PATENT DOCUMENTS

| | | | |
|---|---|---|---|
| 448015 | 9/1991 | European Pat. Off. | H04Q 7/04 |
| 444485 | 9/1991 | European Pat. Off. | H04Q 7/04 |

*Primary Examiner*—Douglas W. Olms
*Assistant Examiner*—Shick Hom
*Attorney, Agent, or Firm*—Cushman Darby & Cushman

[57] ABSTRACT

A method for operating a TDMA system and measuring adjacent base stations in a TDMA radio system in which dummy time slots are inserted into a TDMA signal sent by a base station. These dummy time slots offset the time slots of two carriers with respect to each other. Therefore, a mobile station locked to a predetermined time slot on one carrier is able to measure and decode any time slot of an adjacent carrier within a longer period of time for a possible handover.

12 Claims, 4 Drawing Sheets

MEASURING SIGNAL STRENGTHS OF ADJACENT BASE STATIONS IN A TDMA RADIO SYSTEM FOR A POSSIBLE HANDOVER

A FIELD OF THE INVENTION

The invention relates to a TDMA (Time Division Multiple Access) radio system and a method of measuring signal strengths of adjacent base stations in a TDMA radio system for a possible handover.

BACKGROUND OF THE INVENTION

In mobile communication systems, such as cellular radio systems or trunking radio systems, mobile radio stations may move freely from one radio cell to another. When leaving a previous radio cell, a mobile station has to search for another cell and to register to this new cell. In order to be able to make handover from one cell to another during an on-going call without significant break in the call, the mobile station should be prepared for a change of cell preferably all the time, by monitoring the carriers of the base stations of adjacent cells. Thus there is continuously available precollected information on the coverage of the adjacent cells and the mobile station or the fixed network is capable of making quick decision to choose the best adjacent cell for a handover, when the carrier of the present cell becomes weaker. Thus a handover may be performed for instance during a call without noticeable break in the call.

In radio systems of TDMA type, a plurality of physical channels, i.e. time slots, are arranged for each carrier of a base station by time division multiplexing. In FIG. 1 for example, four time slots 0, 1, 2 and 3 are repeated on the carriers of base stations BS1 and BS2. On these physical channels are conveyed logical channels, which may be divided into two categories: traffic channels transmitting user information and control channels transmitting signalling messages. When a mobile station MS is registered to a base station BS and monitors the carrier thereof, it is normally locked to one of the TDMA time slots, e.g. the time slot 0 of a base station BS1 in FIG. 1. The other time slots 1, 2 and 3 of BS1 are then of no significance for the MS and therefore, the MS may measure the carriers of the adjacent base stations during these time slots. If only measurement of the intensity of a received signal is required and no decoding of the time slot of the adjacent carrier is necessary, no problems will appear with finding the correct time slot. Still, the switching time (the time required for tuning from one frequency to another) of a synthetizer of the MS must be short enough. However, if it is necessary, besides measuring the intensity of the received signal, to decode the information contained in the time slot, in order to derive, e.g., base station identification, system identity, traffic load level or transmission power level, timing problems arise, which are caused by the limited switching time of the MS synthetizer. In the case of FIG. 1, for instance, due to the abovementioned timing problems, the mobile station has time to measure and decode, between the time slots 0 of the base station BS1, only that time slot of the carrier of a base station BS2 which is located approximately at the time slot 2. We may presume that the base station BS2 and the other base stations have the main control channel, which should be measured, in the TDMA time slot 0. Thus the MS may hardly ever be capable of measuring the correct time slot.

If the MS monitors the main control channel (time slot 0) of the base station BS1, it is possible to take the risk and skip over this time slot occasionally and to decode the main control time slot 0 of the adjacent base station. A drawback will be a longer and less reliable call establishment, because the first paging message addressed to the MS may be lost in between. If the MS monitors a traffic channel time slot, it is possible to interrupt reception and speech coding and to skip over this time slot occasionally for decoding the main control channel time slot of the adjacent base station. Drawbacks of this approach will be a lower speech quality and a possibility of the message becoming incomprehensible.

A SUMMARY OF THE INVENTION

The object of the present invention is to enable measuring and decoding carriers of adjacent base stations without above-mentioned drawbacks.

One aspect of the invention is a method of measuring adjacent base stations in a TDMA radio system, comprising mobile radio stations and a fixed radio network having base stations, each of which has at least one carrier, on which carrier control and traffic channels are conveyed in at least one TDMA time slot, in which method a mobile station is locked to one time slot of a base station and measures occasionally control channel time slots of the carriers of the adjacent base stations for a possible handover, which method is according to the invention characterized in that dummy time slots are randomly inserted between normal time slots of a TDMA signal to be sent on the carrier of the base station, for the purpose of making it possible to measure the carriers of the adjacent base stations.

In the invention, dummy time slots, i.e. empty time slots or time slots containing insignificant information, are inserted to a TDMA signal sent by a base station. Due to these extra, dummy time slots, the time slots of two carriers are offset with respect to each other, and therefore, a mobile station locked to a predetermined time slot on one carrier is capable of measuring and decoding any time slot of an adjacent carrier on a longer view. Additionally, the number of dummy time slots transmitted consecutively on a carrier at the same time may be varied randomly, due to which the probability of being measured is approximately the same for all time slots. Sending dummy time slots leads naturally to the fact that time slot numbering is shifted forward in the TDMA signal. In order to make it more easy for a mobile station to detect this change in time slot numbers, in a preferred embodiment of the invention the mobile station is informed about this change in a preceding frame or a multiframe of the TDMA signal. In the preferred embodiment of the invention, dummy time slots are inserted and time slot numbering is shifted at intervals of 1 to 100 seconds on an average. For measuring adjacent stations, the mobile station of the invention may use dummy time slots and/or normal time slots between the time slots it is locked to. A dummy time slot may have the length of a normal time slot or a fraction thereof or it may be longer than the normal time slot.

Another aspect of the invention is a TDMA radio system for implementing the method. The radio system is characterized in that a transmission on a carrier of a base station comprises dummy-random time slots between normal time slots for the purpose of making it possible for a mobile station to measure the carriers of the adjacent base stations.

A BRIEF DESCRIPTION OF THE DRAWINGS

Figure 2:
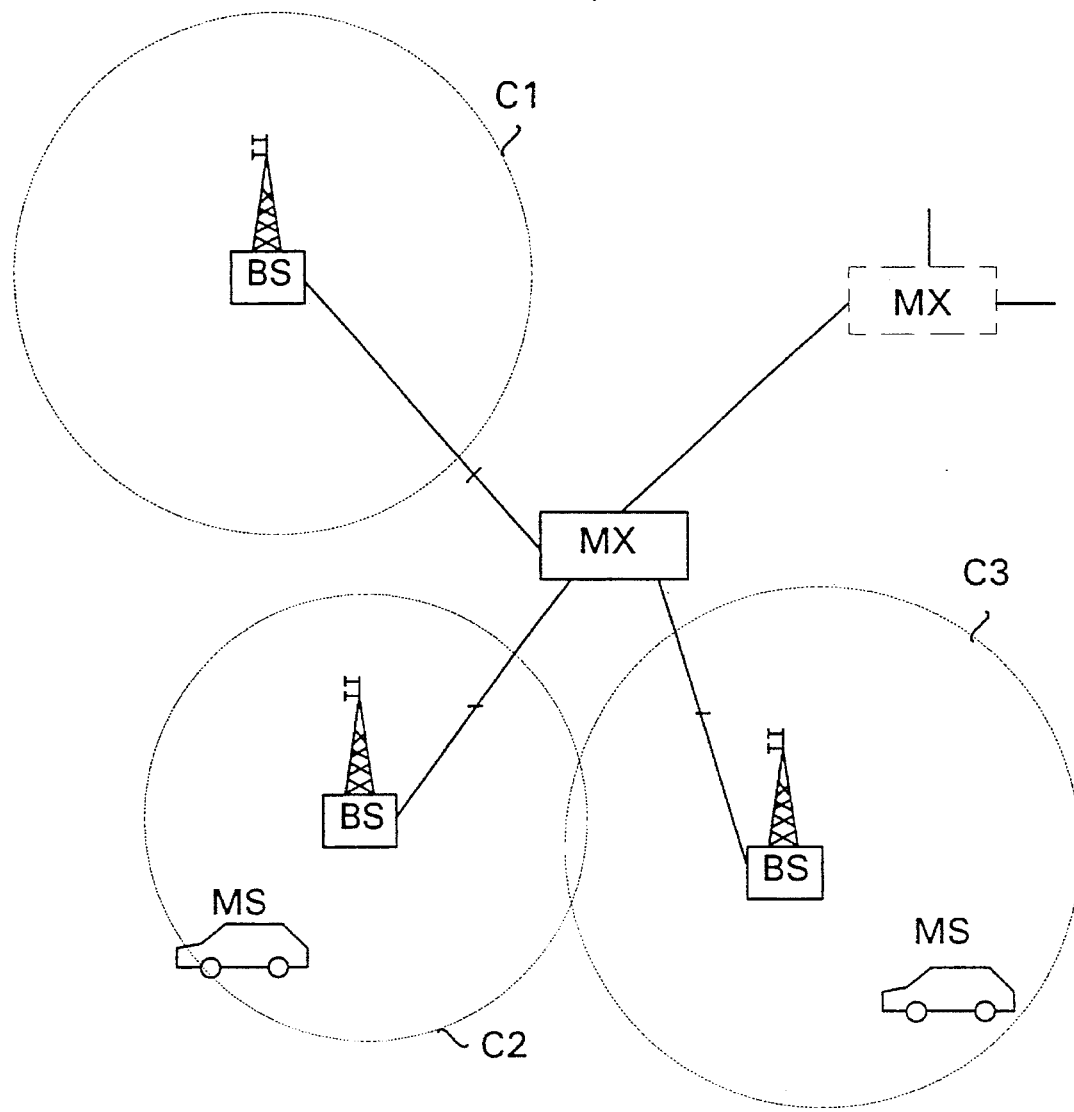
Figure 3:
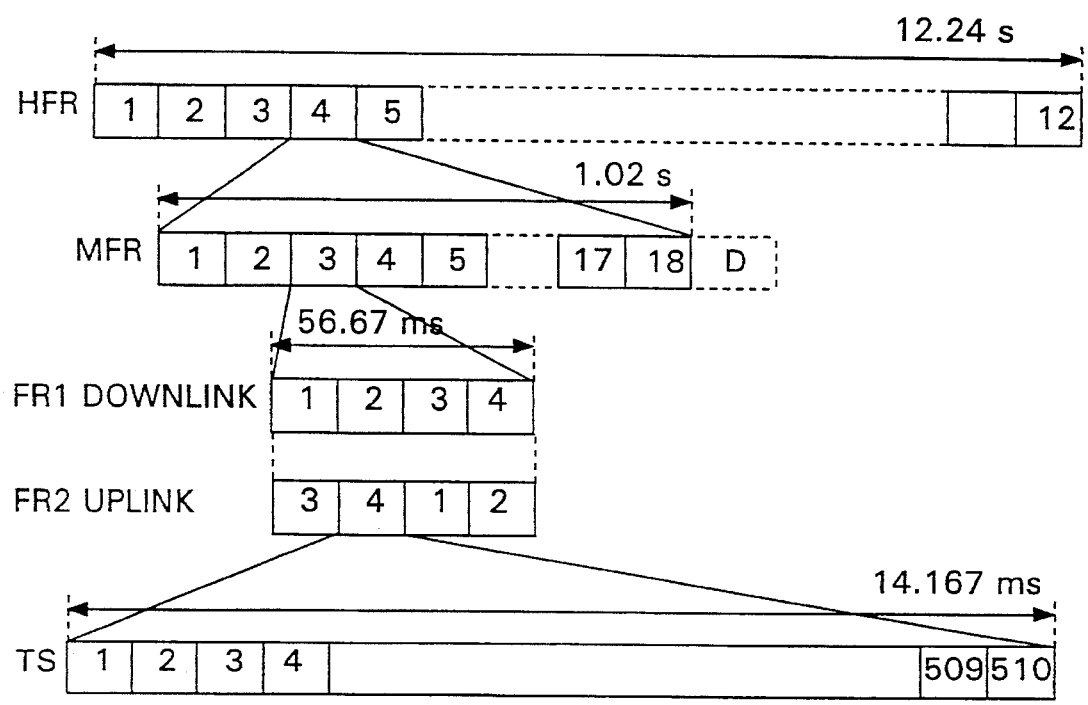
Figure 4:
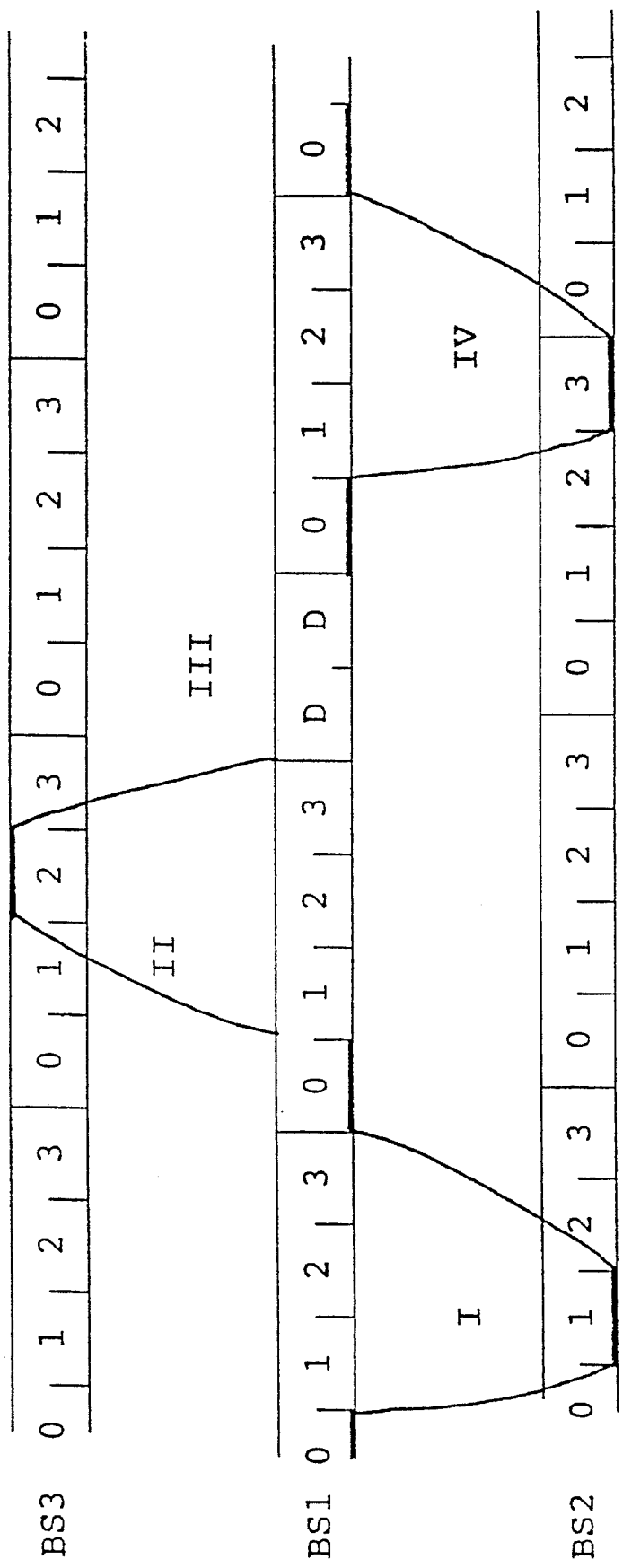

In the following, the invention will be explained in more detail by means of illustrative embodiments referring to the enclosed drawing, in which FIG. 1 is a timing diagram illustrating a measurement of adjacent carriers according to the prior art, FIG. 2 illustrates a radio system, to which the invention may be applied, FIG. 3 illustrates a TDMA frame structure, and FIG. 4 is a timing diagram illustrating a measurement of adjacent carriers according to the invention.

PREFERRED EMBODIMENTS OF THE INVENTION

The invention may be applied to a TDMA radio system of any kind. FIG. 2 shows a trunking radiotelephone system, in which a geographical area covered by the system is divided into smaller radio areas, i.e. radio cells C1, C2 and C3, which are at a distance from each other, abut on each other or overlap each other at edge areas. Each cell. C1, C2, C3 comprises at least one fixed, typically multi-channel transceiver equipment BS, which is called base station. All base stations BS are coupled by fixed connections, such as cables, to an exchange MX, which controls the operation of the base stations BS. Mobile subscriber radio stations MS move freely in the area of the system and have radio communication with the base stations BS on carrier frequencies allocated to the system, i.e. on radio channels.

In a trunking radio system, several user groups, even several user organisations share a common group of channels. In a TDMA system, each pair of downlink and uplink carriers is divided further into time slots, i.e. physical channels, the identifications of which consist of time slot numbers. FIG. 3 illustrates a TDMA frame format comprising hyperframes HFR, multiframes MFR, frames FR and time slots TS.

A basic block of a TDMA format is a time slot TS. In the illustrated example, four time slots TS form a TDMA frame FR. However, the invention is not intended to be limited to this 4-TDMA, but the number of time slots of the frame may be more or less than 4. At the minimum, the frame may comprise only 1 TDMA time slot, a so-called 1-TDMA. A multiframe MFR has 18 frames FR and its duration is about 1 second. A hyperframe comprising 12 multiframes MFR is the longest repeated time period of the TDMA format.

On the physical channels, i.e. in the time slots, are conveyed logical channels, which may be divided into two categories: traffic channels transmitting user information and control channels transmitting signalling messages. These two main categories may be divided further into different subclasses.

When a mobile station MS is registered to a base station BS and monitors the carrier of the base station, it is normally locked to a predetermined TDMA time slot. This time slot may be a traffic channel or a control channel depending on whether a call is going on or not. When the MS moves from the area of a first base station BS to the area of a second base station BS, it needs to be capable of a handover to the carrier of the second base station when the carrier of the first base station becomes weaker. To perform the handover as quickly as possible, the MS is continuously measuring the adjacent carriers in order to obtain information for selecting a new carrier. In FIG. 4 for instance, a mobile station MS locked to the time slot 0 of a base station BS1 may measure adjacent base stations BS2 and BS3 during the other time slots 1, 2 and 3, as is indicated by symbols I and II. As shown earlier in connection with FIG. 1, the MS is capable of measuring only one time slot during this time, if it is necessary to decode the time slot. If each base station has the main control channel, which should be measured, in the time slot 0, a MS of a conventional radio system is probably never capable of measuring and decoding the time slot 0 of the carrier of an adjacent base station, if the base stations are approximately in phase. Further, even if the base stations were off phase, the same problem would arise with some other time slot.

This is solved according to the invention by randomly inserting dummy time slots D between normal time slots of a TDMA signal to be sent on a carrier of a base station, as is illustrated in FIG. 4 by a reference III. Due to the inserted dummy time slots, time slot numberings of adjacent carriers are offset randomly with respect to each other, and therefore, time slots coinciding on different carriers vary randomly. In FIG. 4 for example, it is equally likely that the mobile station MS locked to the base station BS1 may be able to measure any time slot of an adjacent carrier. In FIG. 4 for instance, the measuring point on the carrier of the base station BS2 shifted by about two time slots when two dummy time slots were inserted to the carrier of the base station BS1, as illustrated by a reference IV. In the example presented, a dummy time slot has the length of a normal time slot, but its length may also be a fraction of the length of the normal time slot, or alternatively, a dummy time slot may be longer than the normal time slot, e.g. a multiple thereof.

In principle, dummy time slots may be inserted to any point of a TDMA format, but it is preferable to insert them between successive frames, as in FIG. 4, because a dummy time slot within a frame may lead to complicated implementations of mobile station MS equipment. In a preferred embodiment of the invention, a dummy time slot or a plurality dummy time slots are inserted between multiframes MFR, as illustrated in FIG. 3. If a dummy time slot D is inserted after each multiframe MFR, subsequent phase shift of the carriers and change in time slot numbering occur at intervals of one second. If dummy time slots are inserted only after every 100th multiframe MFR, the time slot numbering changes at intervals of about 100 seconds only. In the preferred embodiment of the invention, a network operator may set an average interval for changes in a time slot numbering, which may be between 1 and 100 seconds.

In the preferred embodiment of the invention, the mobile station receives in advance an information on a change in the time slot numbering. This information is sent for instance in a frame or a multiframe preceding a dummy time slot within a time slot to which the mobile station is locked. A suitable channel for this purpose is a broadcasting channel sending signalling messages to all mobile stations. The advance information facilitates the mobile station MS to detect the change in time slot numbering and to be adapted thereto.

In the preferred embodiment of the invention, the number of dummy time slots to be sent one after another at the same time may vary randomly, for instance between the values 1 and 2. This results in a higher probability of measuring all time slots of an adjacent carrier.

The figures and the description associated thereto are only intended to illustrate the present invention. As to the details, the method and the system of the invention may vary within the scope of the attached claims.

I claim:

1. A method for measuring signal strengths of adjacent base stations in a time division multiple access (TDMA) radio system that includes a plurality of mutually adjacent base stations each having at least one transmitter for transmitting a downlink carrier on at least one downlink carrier frequency, said at least one downlink carrier frequency having a cyclically repeating given plurality of successive normal TDMA time slots for conveying control and traffic channels, and a plurality of mobile radio stations capable of registration serially to individual ones of said base stations, and while so registered to any respective one of said base stations being each assigned a respective numbered normal TDMA time slot from among said plurality of normal TDMA time slots, others of said normal TDMA time slots being idle time slots in relation to each said mobile radio station, said method comprising:

(a) operating at least one of said base stations so as to insert dummy time slots, from time to time, among said normal TDMA time slots being transmitted by the respective transmitter on the respective downlink carrier frequency, according to a set of instances which is not replicated in lockstep by adjacent ones of said base stations, thereby causing a changing temporal offset in occurrence of respectively numbered normal TDMA time slots between said one base station and others of said adjacent base stations;

(b) operating at least one of said mobile stations while registered to a respective said at least one of said base stations, to receive on a respective said downlink carrier frequency during successive ones of said assigned time slots, and to measure signal levels of downlink carrier transmissions from others of said adjacent base stations during non-assigned ones of said time slots.

2. The method of claim 1, wherein:

said measuring is conducted during both non-assigned normal TDMA time slots and dummy time slots.

3. The method of claim 1, wherein:

said set of instances is random.

4. The method of claim 1, wherein:

in each of said instances, the number of dummy time slots which is inserted, is random, within a given set of possible values.

5. The method of claim 4, wherein:

said given set of possible values consists of 0, 1 and 2.

6. The method of claim 1, wherein:

in practicing step (a), a respective said transmitter of each said at least one of said base stations transmits the respective at least one downlink carrier frequency in a succession of frames containing said normal TDMA time slots, with said dummy time slots being inserted between at least some temporally successive ones of said frames.

7. The method of claim 6, wherein:

said frames occur in multiframes of temporally uniform duration and which are free of inserted dummy time slots, with said dummy time slots being inserted between at least some temporarily successive ones of said multiframes.

8. The method of claim 1, further including:

correspondingly shifting time slot numbering of normal TDMA time slots transmitted by the respective said downlink carrier upon insertion of each dummy time slot.

9. The method of claim 8, further comprising:

sending by the respective said base station to the respective said mobile station during said assigned time slots, information as to each said change prior to occurrence of such change.

10. The method of claim 8, wherein:

said shifting of time slot numbering is conducted so as to occur on average, at intervals within the range of from 1 to 100 seconds.

11. The method claim 1, wherein:

each dummy time slot has a temporal duration which is different from that of a respective normal TDMA time slot.

12. A time division multiple access (TDMA) radio system equipped to allow a mobile station thereof to measure signal strengths of base stations adjacent to a base station to which the mobile station is registered, said TDMA radio system comprising:

a plurality of mutually adjacent base stations each having at least one transmitter for transmitting a downlink carrier on at least one downlink carrier frequency, said at least one downlink carrier frequency having a cyclically repeating given plurality of successive normal TDMA time slots for conveying control and traffic channels; and a plurality of mobile radio stations capable of registration serially to individual ones of said base stations, and while so registered to any respective one of said base stations being each assigned a respective numbered normal TDMA time slot from among said plurality of normal TDMA time slots, others of said normal TDMA time slots being idle time slots in relation to each said mobile radio station;

at least one of said base stations being arranged so as to insert dummy time slots, from time to time, among said normal TDMA time slots being transmitted by the respective transmitter on the respective downlink carrier frequency, according to a set of instances which is not replicated in lockstep by adjacent ones of said base stations, thereby causing a changing temporal offset in occurrence of respectively numbered normal TDMA time slots between said one base station and others of said adjacent base stations; and at least one of said mobile stations while registered to a respective said at least one of said base stations, being arranged to receive on a respective said downlink carrier frequency during successive ones of said assigned time slots and to measure signal levels of downlink carrier transmissions from others of said adjacent base stations during non-assigned ones of said time slots.

* * * * *